United States Patent Office 3,674,393
Patented July 4, 1972

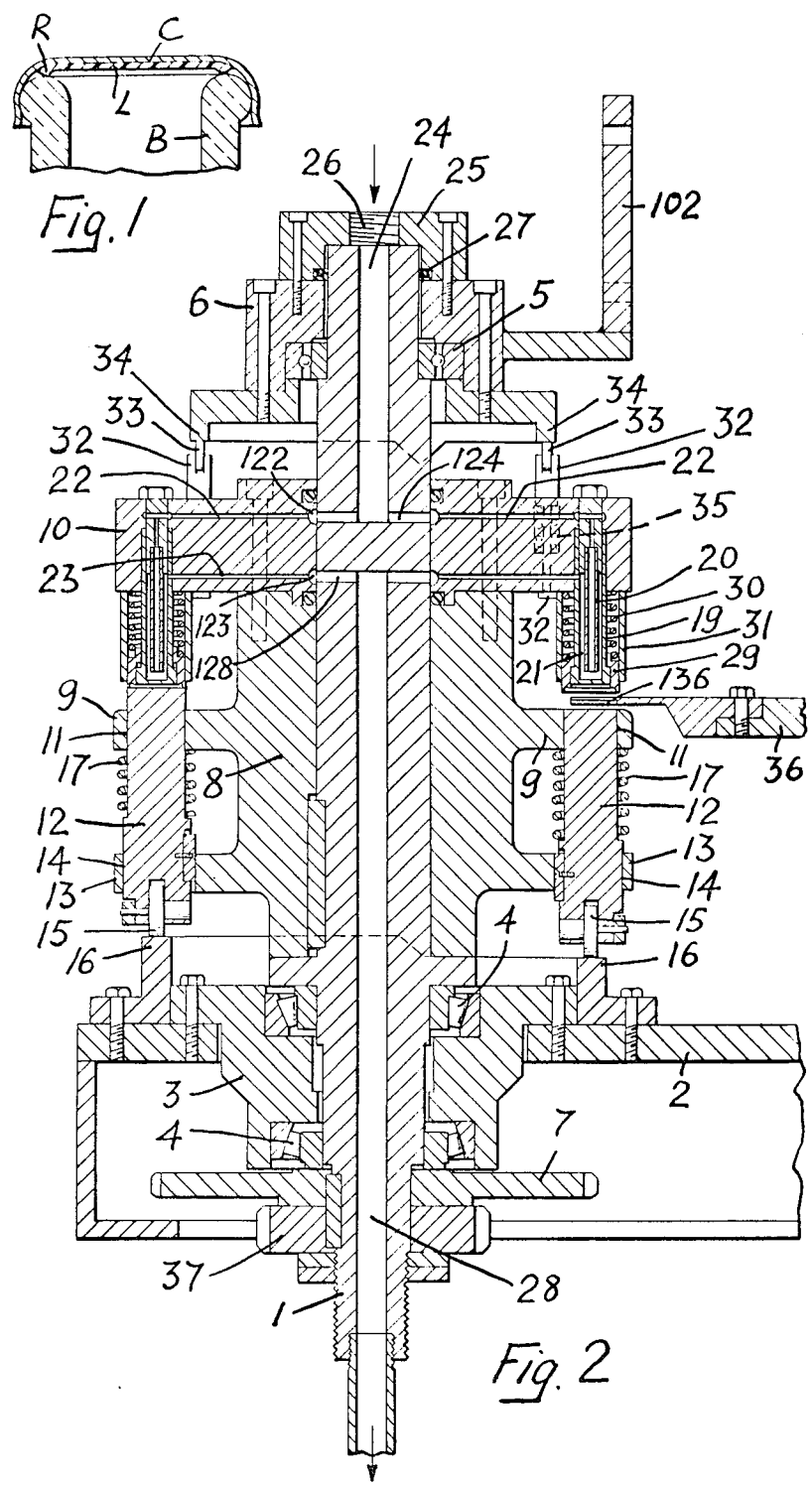

3,674,393
DEVICE FOR APPLYING LINERS OF THERMO-PLASTIC MATERIAL TO CLOSURE CAPS OR THE LIKE
Ettore Busi, 191 Via Selice, Imola, Italy
Filed July 23, 1970, Ser. No. 57,449
Claims priority, application Italy, July 29, 1969, 7,210/69
Int. Cl. B29c 3/00
U.S. Cl 425—110                                         10 Claims

ABSTRACT OF THE DISCLOSURE

A device for forming inner coatings of thermoplastic material in sealing caps has a shaft mounted for rotation about a vertical axis, a platform secured to the shaft, bearers for the sealing caps coaxial with the shaft and slidably mounted in the platform, a plate fixed to the shaft above the platform, and compression plungers mounted in the plate in register with the bearers, a sealing cap being placed on a bearer concave side upwards and containing a metered, warm and consequently plastically deformable plastic composition which is formed into an inner coating in the sealing cap by relative displacement between the compression plunger and the sealing cap bearer.

BACKGROUND OF THE INVENTION

(1) Field of the invention

This invention relates to a device for forming inner coatings of thermoplastic synthetic material in sealing caps or the like, such as a crown cap for a glass bottle.

(2) Description of the prior art

In the devices of this kind, for example as shown in U.S.A. patent specification No. 3,135,019, the sealing cap bearers are fixedly i.e. immovably joined to the rotary platform, and the co-ordinated compression rams or plungers are arranged in the rotary plate in vertically displaceable manner and are lowered in the direction towards the sealing cap bearers for pressure-moulding of the plastic composition. This displacement of the compression plungers requires a complex, costly and failure-prone system, e.g. comprising movable flexible pipes which displace passages for connection of the liquid-cooled compression plungers with the co-ordinated cooling system.

It is a main object of the invention to eliminate these shortcomings of known devices and to provide a device of the kind initially defined, which allows simple, reliable and inexpensive connection of the liquid-cooled compression plungers to the corresponding cooling system.

SUMMARY

In the present invention, the compression rams or plungers are immovably fastened on the rotary plate and are connected to the cooling system by means of passages or pipes firmly joined to the rotary plate and the vertical shaft of the rotary platform, and the sealing cap bearers on the rotary platform comprise vertically displaceable lower plungers which are raisable against the compression plungers for pressure-moulding of the plastic composition. With the device of the invention, the movable jointed articulated or flexible pipes, and the reciprocally displaceable passage systems for connection of the liquid-cooled compression plungers to the co-ordinated cooling system, are not necessary and the parts of the connecting pipes or passages displaceable relative to each other can be reduced to a minimum size. This results in a connection between the liquid-cooled compression heads and the corresponding cooling system which is structurally much simpler and less costly, and provides greater operational reliability and lesser servicing costs.

In a preferred embodiment of the invention, the connecting pipes or ducts between the compression plungers and the corresponding cooling systems are formed as bores or passages in the shaft of the rotary platform and in the rotary plate of the compression plungers.

Advantageously, the vertical shaft of the rotary platform has formed in it a longitudinally directed blind feed bore from one shaft end and a longitudinally directed blind outflow bore for the coolant from the other shaft end, and these longitudinal bores are in communication with the separate compression plungers through co-ordinated transversal bores in the shaft and approximately radial coolant inflow and outflow passages in the rotary plate.

BRIEF DESCRIPTION OF THE DRAWINGS

FIG. 1 shows a cross-section of a sealing cap provided with an inner coating of thermoplastic synthetic material, fastened on a bottle opening;

FIG. 2 shows a vertical cross-section of a device, for the forming inner coatings of thermoplastic synthetic material in sealing caps;

DESCRIPTION OF THE PREFERRED EMBODIMENT

Figure 3:
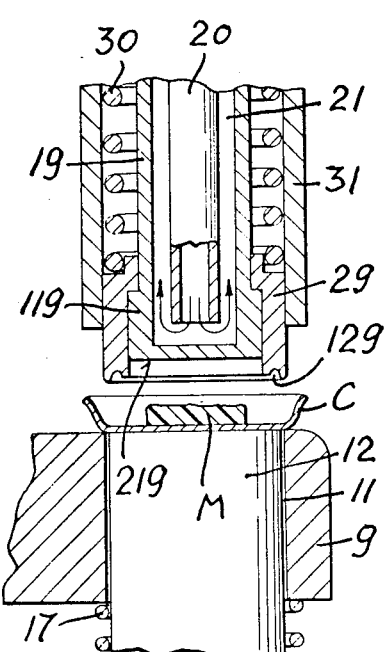
FIGS. 3, 4 and 5 show a compression plunger of the co-operating lower plunger of the device shown in FIG. 2, in vertical section, in three different operating stages during the forming of the inner coating of a sealing cap.

FIG. 1 illustrates a metal sealing cap C, e.g. a crown cap, having a base provided with an inner coating L of thermoplastic synthetic material. This coating L may have the same thickness throughout, i.e. have a surface which is plane throughout, but the coating L may optionally be profiled, as illustrated. In this embodiment the coating has a peripheral marginal bead R which is sealingly pressed against the upper rim of the bottle opening when the cap C is secured on the bottle to be sealed.

To form such inner coatings L in sealing caps C, a metered, warm and consequently plastically deformable plastic composition M is placed in the cap C positioned with its concavity directed upwards, i.e. like a pan or tray, and is pressed into a plane or profiled coating L. The device for carrying out this operation is illustrated in FIGS. 2 to 6.

The device consists of a vertical shaft 1, the lower extremity of which traverses the bearing element 3 fastened on a lower machine frame portion 2; the shaft is rotatably journalled in the element 3 by means of anti-friction bearings 4. The upper extremity of the shaft 1 is supported in anti-friction bearings 5 by means of an annular bearing element 6 fastened on an upper machine frame portion 102. On the lower extremity of the shaft 1 projecting beyond the bearing element 3 is fastened a gearwheel 7 through which the shaft 1 is rotated.

Between the two bearing elements 3 and 6, the shaft 1 has fastened on it a bushing 8 or sleeve which carries a flange-like horizontal rotary platform 9. At a distance above the rotary platform 9, the shaft 1 has arranged on it a horizontal rotary plate 10 which is connected to the sleeve 8 for rotation with the shaft 1 and the rotary platform 9.

Bores 11, in each of which a lower plunger 12 is displaceably arranged, are formed vertically in the rotary platform 9 in regular distribution along the periphery of the rotary platform. Each lower plunger 12 is vertically displaceable in another bore 14 formed in a lower flange 13 of the sleeve 8, and on its lower extremity carries a sensing roller 15 which runs on an annular cam track 16 fastened on the lower machine frame portion 2. Each lower plunger 12 is pressed downwards by means of a spring 17 which ensures constant contact of the sensing roller 15 with the cam track 16.

Downwardly projecting hollow compression plungers 19 are arranged co-axially with the lower plungers 12, on the rotary plate 10. Each compression plunger 19 has its upper extremity inserted and fixed in a corresponding bore of the rotary plate 10. The lower extremity of the compression plunger 19 is closed and forms a slightly enlarged head portion 119 terminating in a flat area at the underside 219. In the hollow compression plunger 19 is co-axially situated a vertical internal tube 20 which has its upper extremity equally inserted and fixed in a corresponding bore of the rotary plate. The lower extremity of the internal tube 20 is open and terminates at a spaced distance from the closed lower extremity of the compression plunger 19. Between the internal tube 20 and the casing of the compression plunger 19 is an annular cooling space 21 through which is ducted a coolant, e.g. oil. The coolant flows downwards through the internal tube 20, runs out of the open lower extremity of the internal tube 20 into the compression plunger 19 and then flows upwards through the annular cooling space 21 between the internal tube 20 and the casing of the compression plunger 19. The upper extremity of the internal tube 20 is connected to a radial coolant inflow passage 22 formed in the rotary plate 10. The upper extremity of the hollow compression plunger 19, associated with the annular cooling space 21, is in communication with a radial outflow passage 23 formed in the rotary plate 10. The inflow passages 22 on the one hand, and the corresponding outflow passages 23 on the other hand, which are associated with the different compression plungers 19, are arranged in an approximately star-shaped pattern in two corresponding horizontal planes situated at different heights, and are each in communication with annular grooves 122 and 123 respectively, which are formed around the shaft 1 in the central bore of the rotary plate 10.

A co-axial blind bore 24 is formed in the upper end of the shaft 1 and acts as a feed bore for the coolant and is in communication at its inner extremity with the internal groove 122 of the rotary plate 10 associated with the inflow passages 22 of the compression plungers 19, through transverse bores 124. The outer extremity of this feed bore 24 is connected to the feed pipe of a circulatory cooling system (not shown) which is co-ordinated with the compression plungers 19. Optional rotary joints, known per se, may be employed for this purpose. In the embodiment illustrated, the upper end of the shaft 1 projecting out of the corresponding bearing element 6 is covered by a cowl-like capping element 25 which is fastened to the bearing element 6 and has a tapped bore 26 for connection of the cooling system feed pipe which is not illustrated. A sealing ring 27 ensures a seal between the capping element 25, the bearing element 6 and the shaft 1. The shaft 1 moreover has formed in it extending from its lower end a blind co-axial bore 28 which represents an outflow bore for the coolant and is in communication at its inner extremity, through transverse bores 128, with the internal groove 123 of the rotary plate 10 associated with the outflow passages 23 of the compression plungers 19. The outer extremity of this outflow bore 28 may be connected to the return duct of the circulatory cooling system by means of optional rotary joints known per se, or of an analogous device such as shown for the upper extremity of the shaft 1. It is possible moreover to allow the outflow bore 28 of the shaft 1 to open freely into the liquid tank of the cooling system.

Each compression plunger 19 carries around its lower head portion 119, a vertically displaceable annular plunger 29 which is pressed downwards by a spring 30 into an idle position in which it projects a little beyond the lower delimiting face 219 of the compression plunger 19 and bears on the upper step of the lower enlarged head portion 119 of the compression plunger 19, as illustrated in FIG. 3. The lower delimiting face of the annular plunger 29 is provided with an annular groove 129 which corresponds to the marginal bead R of the coating L to be formed. The inner delimiting rim of this annular groove 129 is a little lower than its outer delimiting rim, as apparent from FIGS. 3 to 5.

Around the annular plunger 29 is arranged a longitudinally displaceable tubular stripper 31 which is connected to a ram 32 which is vertically displaceable in the rotary plate 10. The upper extremity of this ram 32 projecting out of the rotary plate 10 carries a sensing roller 33 which runs on an annular cam track 34 fastened on the upper bearing element 6. Each ram 32 is acted upon by a spring 35 which presses the ram 32 with its sensing roller 33 against the cam track 34. The dimensional ratios are chosen so that the lower head portion 119 of the compression plunger 19 and the annular plunger 29 may both be inserted into the sealing cap C, whereas the stripper 31 co-operates with the flange rim of this cap.

Figure 6:
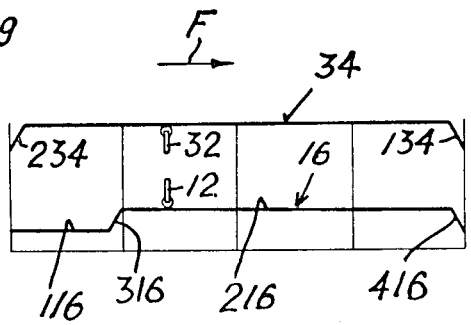
FIG. 6 shows a time-displacement diagram of a lower plunger and of a cap stripping device arranged on the compression plunger.

FIG. 6 diagrammatically illustrates the developed profiles of the annular cam tracks 16, 34 which correspond to the graphs of motion (traveltime diagrams) of respectively, the lower plungers 12 and the strippers 32. The arrow F shows the direction of rotation of the shaft 1 with the rotary platform 9 and the rotary plate 10. The upper cam track 34 coordinated with the strippers 32 has a single downwardly projecting cam consisting of a rising slope 134 and a falling slope 234. The lower cam track 16 coordinated with the lower plungers 12 has a plane lower portion 116 which extends from the crest of the cam 134, 234 of the upper cam track 34 in the direction of rotation and through an angle of approximately 90° and is joined by means of a rising run-up face 316 to a higher and equally plane portion 216 of the cam track 16. This higher portion 216 of the lower cam track 16 extends through an angle of approximately 270° and terminates at the foot of the rising slope 134 of the cam 134, 234 of the upper cam track 34, where it is joined again to the plane lower track portion 116 by a downwardly sloping run-off face 416. The downwardly sloping run-off face 416 of the lower cam track 16 has approximately the same inclination as the rising slope 134 of the cam 134, 234 of the upper cam track 34 and extends through the same angle as the said rising cam slope 134.

During the rotary displacement of the shaft 1 with the rotary platform 9 and the rotary plate 10, each press unit consisting of a compression plunger and a lower plunger 12 travels over the annular cam tracks 16, 32 in the direction of the arrow F, resulting in the following mode of operation.

In the area of the lower portion 116 of the lower cam track 16, the lower plunger 12 is lowered by the action of the spring 17, so that its upper head face is positioned approximately flush with the surface of the rotary platform 9, as apparent in particular from FIG. 3. The stripper 31 is lifted by the spring 35 so that its lower edge is positioned at a sufficient distance above the lower delimiting face 219 of the compression plunger 19. Shortly before the rising run-up face 316 of the lower cam track 16, a sealing cap C is placed on the rotary platform 9 with its concavity upwards, and is positioned centrally above the lower plunger 12. This cap C already contains a metered, warm and consequently plastically deformable plastic composition M, as shown in FIG. 3. The infeed and positioning of the sealing cap C may be performed by means of optional conveying means known per se. FIG. 2 shows such a conventional, horizontal and rotary feed plate 36 which partly overhangs the rotary platform 9 and on its periphery has approximately semi-circular notches 136, each for reception of one sealing cap C. The feed plate 36 is driven synchronously with the rotary platform 9, in such manner that one of its peripheral notches 136 with the corresponding cap C is in each case positioned coaxially with a compression plunger 19 and the corresponding lower plunger 12. The synchronous displacement may be accomplished by driving the feed plate 36 from a gearwheel 37 fixed to the lower end of the shaft 1.

Immediately after the positioning of the sealing cap C between a lower plunger 12 and compression plunger 19, the lower plunger 12 together with the cap C lying thereon, is lifted by the rising run-up face 316 of the lower cam tracks 16. The cap C is thus pressed upwards from below, initially against the projecting annular plunger 29. The plastic composition M placed approximately centrally in the cap C is consequently enclosed within a chamber which is delimited at the top by the underside 219 of the compression plunger 19, at the bottom by the base of the cap and laterally by the annular plunger 29. Only the higher outer delimiting rim of the lower annular plunger groove 129 is brought to bear on the base of the cap, so that this annular plunger groove 129 remains in communication with the said chamber over its lower inner delimiting rim. Thereupon, i.e. during the remainder of the stroke of the lower plunger 12, the annular plunger 29 is also lifted together with the cap C against the force of the spring 30, so that the plastic composition M enclosed in the said chamber is compression-moulded by the plane underside 219 of the compression plunger 19, i.e. pressed against the base of the cap and squashed. The plastic composition flows over the lower inner rim of the lower annular groove 129 of the annular plunger 29 and into this groove 129, filling the same completely. As apparent from FIG. 4, this forms a flat plastic coating L in the central area of the cap case under the action of the plane underside 219 of the compression plunger 19, and a projecting marginal bead R of this coating in the area of the annular plunger groove 129. The higher outer delimiting rim of the annular plunger 29 bearing against the cap base prevents lateral seepage of the compression-moulded plastic composition and an undesirable soiling of the cap flange.

Figure 4:
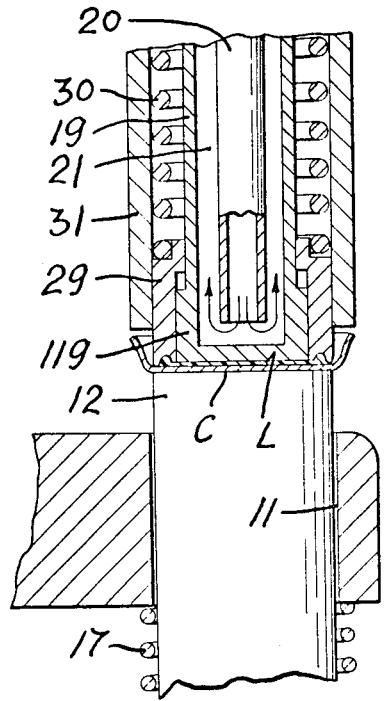

The sealing cap C clamped fast in the manner described in the foregoing between the stationary compression plunger 19 and the raised lower plunger 12 and simultaneously taken off the feed plate 36, then accompanies the rotary displacement of the rotary platform 9. The lower plunger 12 is held in its raised position as shown in FIG. 4 by the higher portion 216 of the lower cam track 16, so that the plastic composition compression-moulded into an inner coating L, R of the sealing cap C continues to be exposed to compression pressure. At the same time, the plastic coating L, R of the cap C is cooled by the coolant flowing in the hollow compression plunger 19, and is consequently solidified. The coolant flows through the upper deed bore 24 and the transverse bores 124 of the shaft 1 into the inner annular groove 122 of the rotary plate 10 and thence through the radial inflow passage 22 and the internal tube 20 into the lower head portion 119 of the compression plunger 19; the coolant then flows upwards from below through the cooling space 21 in the compression plunger 19 and runs out through the radial outflow passage 23 and the inner annular groove 123 of the rotary plate 10 as well as through the subsequent transverse bores 128 and the lower outflow bore 28.

Figure 5:
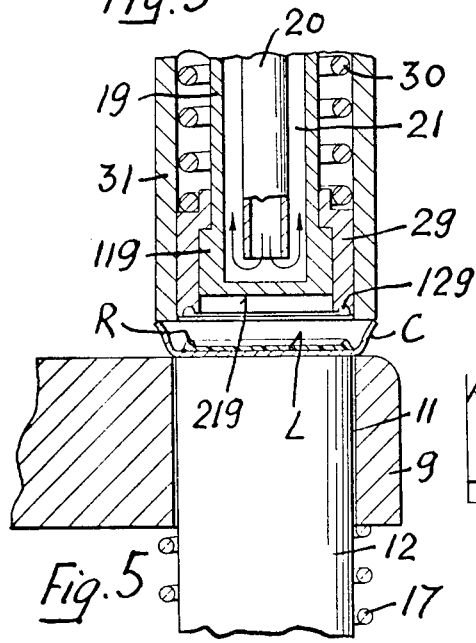

The lower plunger 12 is lowered by the spring 17 in the area of the dropping run-off face 416 of the lower cam track 16. At the same time, and by the same distance, the stripper 31 is also displaced downwards against the force of the spring 35 by the rising slope 134 of the cam 134, 234 of the upper cam track 34. The stripper 31 comes into contact with the rim flange of the sealing cap C and accompanies the downward displacement of the sealing cap C caused by the lowering of the lower plunger 12 until the upper head face of the lower plunger 12 is again positioned flush with the surface of the rotary platform 9, as shown in FIG. 5. During this lowering of the lower plunger 12, the sealing cap C is initially separated from the underside 219 of the compression plunger 19 by the annular plunger 29 displaced downwards into its idle position as shown in FIG. 3 under the action of the spring 30. The cap C is then freed and stripped off the stopped annular plunger 29 by means of the stripper 31 is then raised again by the spring 35 to its idle position as shown in FIG. 3, in the area of the downward slope 234 of the cam 134, 234 of the upper cam track 34. The sealing cap C equipped with a solidified plastic coating L, R is removed from the rotary platform 9 in the initial portion of the lower portion 116 of the lower cam track 16, e.g. by means of an ejection bar or the like, which is known per se.

The invention is not limited to the embodiment illustrated, other embodiments being possible within the scope of the general inventive principle. For example, the vertical shaft 1 may be stationary, and only the rotary platform 9 may revolve together with the rotary plate 10. The rotary plate 10 may also be replaced by a star wheel having a compression plunger 19 fastened on each branch.

I claim:

1. A device for forming inner coatings of thermoplastic synthetic material in sealing caps and like devices, comprising a rotary platform rotatably mounted about a vertical axis, bearers in the rotary platform for the separate sealing caps to be positioned with their concavities turned upwards each containing a metered warm and consequently plastically deformable plastic composition, a rotary plate set at a distance above the platform and comprising downwardly projecting liquid cooled compressing plungers coaxially aligned with the sealing cap bearers, the plastic composition contained in each sealing cap being compression moulded into an inner coating in the sealing cap within the area of a peripheral portion of the rotary platform by relative displacement of the compression plunger and the sealing cap bearer, the compression plungers being fixed to the rotary plate and being connected to a cooling system by connecting ducts, the sealing cap bearers on the rotary platform being formed as lower plungers which are vertically displaceable against the compression plungers for the compression moulding of the plastic composition, the rotary platform and the rotary plate are fixed to a shaft mounted for rotation about a vertical axis and the connecting ducts between the compression plungers and the cooling system are bores formed in the shaft of the rotary platform and in the rotary plate of the compression plunger.

2. A device according to claim 1, wherein a longitudinally extending blind feed bore is formed in the vertical shaft to extend downwardly from the upper end of the shaft, and a longitudinally extending blind outflow bore for the coolant is formed to extend upwardly from the lower end of the shaft, these longitudinal bores being in communication through coordinated transverse bores in the shaft and through subsequent approximately radial inflow and outflow passages formed in the rotary plate with the separate compression plungers.

3. A device according to claim 2, wherein the transverse bores of the shaft which co-ordinate with the feed bore and the outflow bore each terminate in an annular groove formed around the shaft and/or in the rotary plate for communication with the inflow and outflow passages respectively of the rotary plate.

4. A device according to claim 3, wherein an annular plunger is arranged around the lower head portion of each compression plunger to be vertically displaceable with respect thereto, the annular plunger projecting beyond the underside of the compression plunger in an idle position and being displaceable upwards against a spring when engaged by a sealing cap to co-operate with a marginal portion of the cap base.

5. A device according to claim 4, wherein the annular plunger is provided on its lower head face with an annular groove having an inner delimiting rim lower than its outer delimiting rim.

6. A device according to claim 5, wherein a vertically displaceable cap stripper is arranged around the annular plunger for movement with respect thereto to co-operate with the flange rim of a sealing cap to strip the sealing cap from the end of the annular plunger.

7. A device according to claim 6, wherein the cap stripper is lowered simultaneously and synchronously with the lower plunger.

8. A device according to claim 7 wherein the lower plungers are vertically displaceable in bores formed in the rotary platform and are provided with sensing rollers which are pressed downwardly by springs acting on the plungers to engage with an annular cam track fixed below the rotary platform, the cam track controlling the upward and downward displacement of the lower plungers.

9. A device according to claim 8, wherein the cap strippers are mounted on rams vertically displacable in bores formed in the rotary plate, the rams being provided with rollers which are pressed upwardly by springs acting on the rams to engage with an annular cam track fixed above the rotary plate to control the upward and downward displacement of the cap strippers.

10. A device according to claim 9, wherein the vertical shaft is rotatably journalled in upper and lower bearings fixed in support means and is provided with a gear wheel for engagement with drive means.

References Cited

UNITED STATES PATENTS

| 3,135,019 | 6/1964 | Aichele | 264—268 UX |
| 3,366,723 | 1/1968 | Green | 264—268 |

ROBERT L. SPICER, JR., Primary Examiner

U.S. Cl. X.R.

264—268; 425—345